(12) United States Patent
Person et al.

(10) Patent No.: US 9,076,083 B1
(45) Date of Patent: Jul. 7, 2015

(54) SYSTEM, METHOD, APPARATUS AND COMPUTER READABLE MEDIUM FOR SECURE ONE-TIME PRINTING OF COUPONS

(71) Applicant: Koupon Media, Inc., Frisco, TX (US)

(72) Inventors: Todd J. Person, Frisco, TX (US); Benjamin Walker, Addison, TX (US)

(73) Assignee: Koupon Media, Inc., Frisco, TX (US)

( * ) Notice: Subject to any disclaimer, the term of this patent is extended or adjusted under 35 U.S.C. 154(b) by 0 days.

(21) Appl. No.: 14/214,164

(22) Filed: Mar. 14, 2014

Related U.S. Application Data

(60) Provisional application No. 61/793,389, filed on Mar. 15, 2013.

(51) Int. Cl.
| | |
|---|---|
| *G06K 15/00* | (2006.01) |
| *G06F 15/02* | (2006.01) |
| *G06F 21/85* | (2013.01) |

(52) U.S. Cl.
CPC .............. *G06K 15/00* (2013.01); *G06F 21/85* (2013.01); *G06F 15/0233* (2013.01)

(58) Field of Classification Search
CPC .............. G06Q 30/02; G06Q 30/0224; G06Q 30/0225; G06Q 30/0235; G06Q 30/0253; G06Q 30/0239; G06Q 30/0209; G06Q 30/209; G06Q 30/0234; G06Q 20/20; G06Q 30/0273
USPC .......................... 358/1.9, 1.6; 705/62, 73–76, 705/14.22–14.4, 14.72, 14.73, 26.81–27.2, 705/408–416
See application file for complete search history.

(56) References Cited

U.S. PATENT DOCUMENTS

| | | | |
|---|---|---|---|
| 8,219,385 B2 | 7/2012 | Sprecher et al. | |
| 2008/0133365 A1 | 6/2008 | Sprecher et al. | |
| 2008/0277168 A1* | 11/2008 | Doerwald ................... | 177/25.15 |
| 2011/0153410 A1* | 6/2011 | Muthugopalakrishnan et al. ........................... | 705/14.39 |
| 2013/0091002 A1* | 4/2013 | Christie et al. ............. | 705/14.26 |

OTHER PUBLICATIONS

IncentiveTargeting, "Our Platform," available online at URL: <http://www.incentivetargeting.com/platform/>, at least as early as Apr. 29, 2010.
IncentiveTargeting, "Manufacturers: Your Insights in Action," available online at URL: <http://www.incentivetargeting.com/manufacturers/index.html, at least as early as Apr. 30, 2010.
Interactive Advertising Bureau, "IAB Platform Status Report: A Mobile Advertising Overview", Jul. 2008.

* cited by examiner

*Primary Examiner* — Marcellus Augustin
(74) *Attorney, Agent, or Firm* — Patent Capital Group

(57) ABSTRACT

Technologies are provided in embodiments to enable secure one-time printing for electronic coupons. The embodiments are configured to provide, for display on a display screen of a user device, one or more coupon offers, to receive information indicating at least one offer is selected by a user, to communicate a unique identifier of the user device and an indication of the at least one selected offer to a coupon platform, and to receive the at least one selected offer to be printed if the at least one selected offer is available. Embodiments are also configured to bypass a print dialog box to provide the at least one selected offer directly to a default printer associated with the user device. Specific embodiments are configured to communicate to the coupon platform whether the print was successful. In specific embodiments, coupon codes are not displayed with the one or more coupon offers.

18 Claims, 9 Drawing Sheets

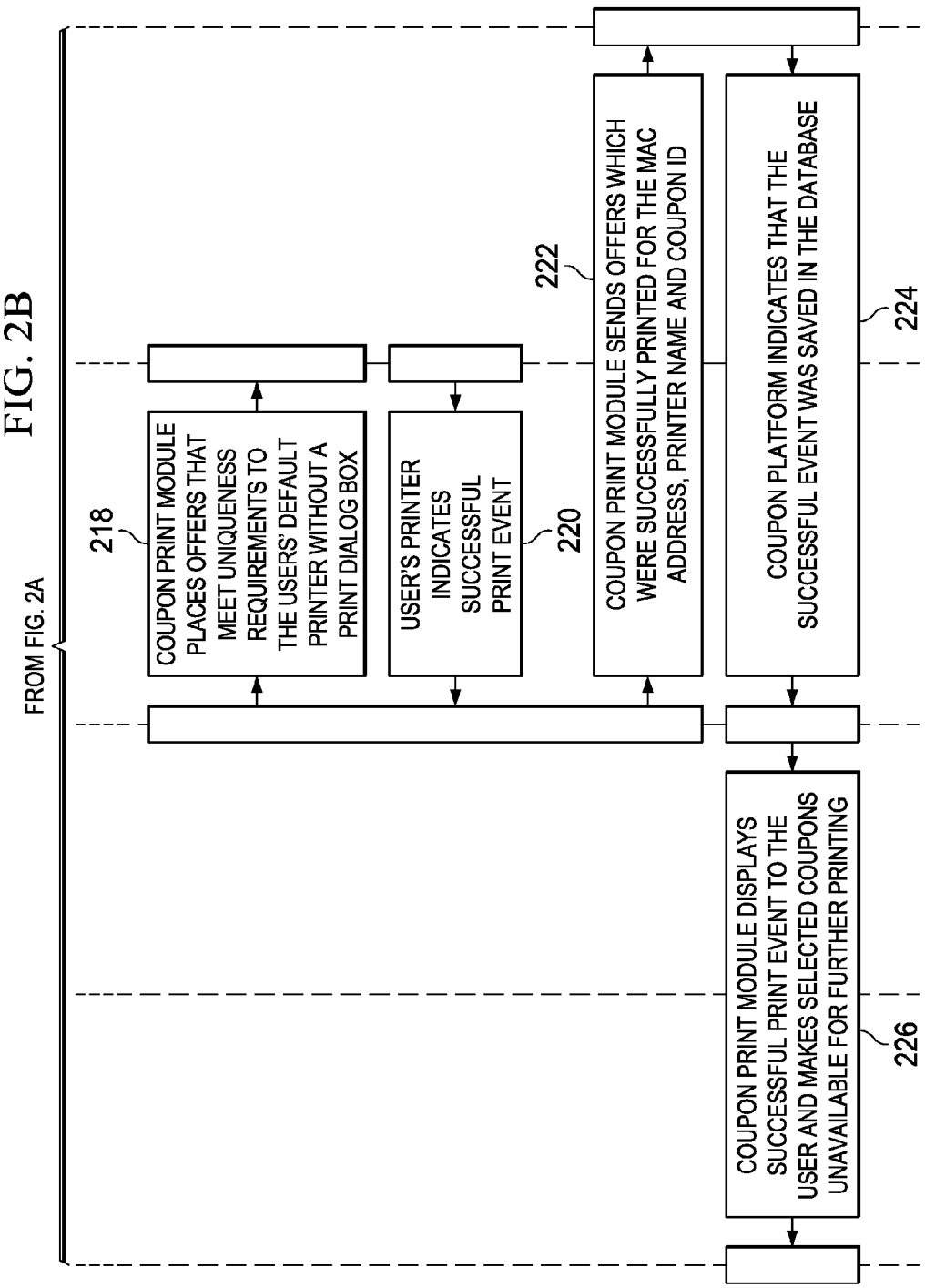

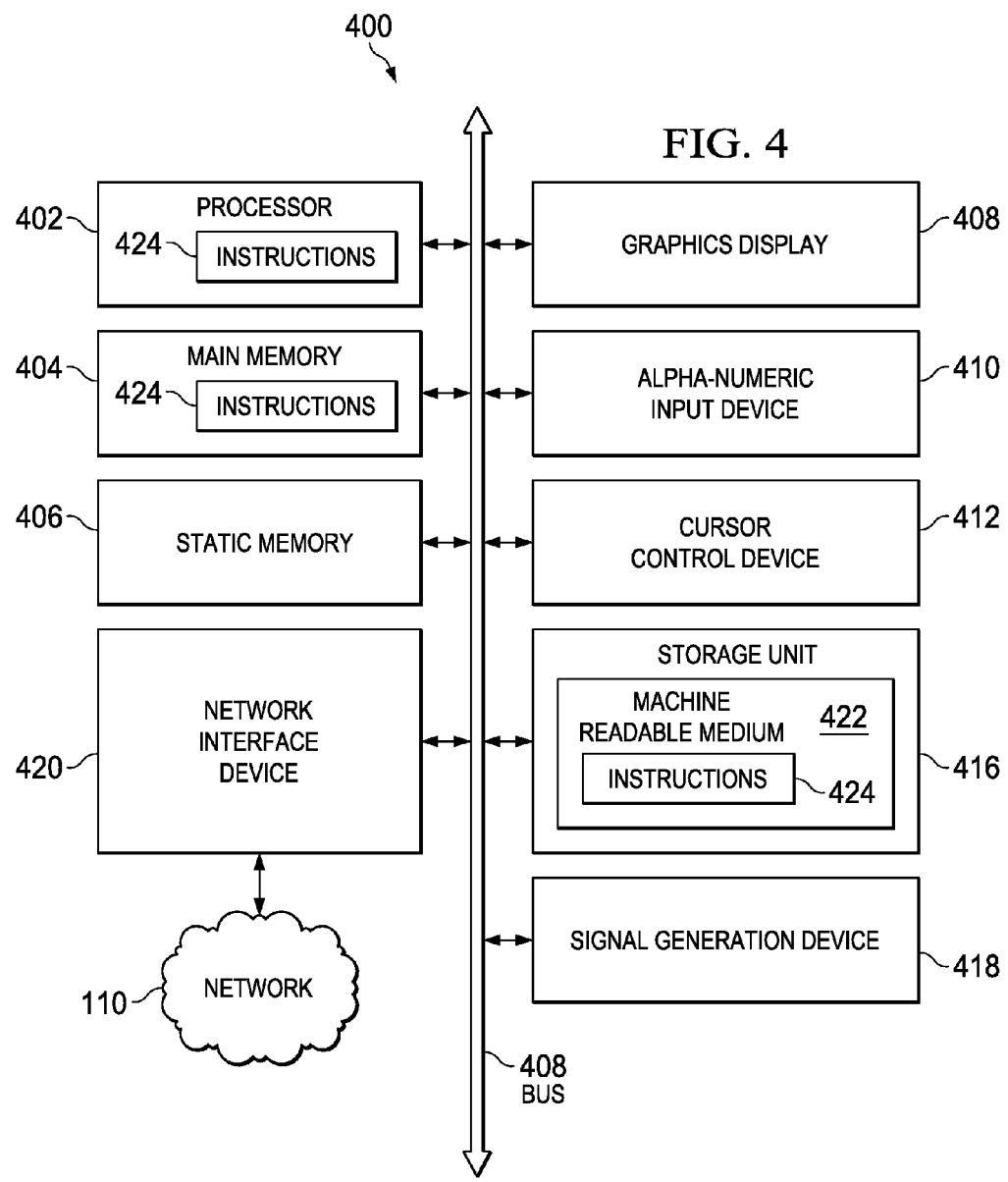

US 9,076,083 B1

SYSTEM, METHOD, APPARATUS AND COMPUTER READABLE MEDIUM FOR SECURE ONE-TIME PRINTING OF COUPONS

CROSS-REFERENCE TO RELATED APPLICATIONS

This application claims the benefit of priority under 35 U.S.C. §119(e) of U.S. Provisional Application Ser. No. 61/793,389, filed Mar. 15, 2013, by Benjamin Walker et al., entitled "APPLICATION FOR SECURE PRINTING," which is hereby incorporated by reference in its entirety.

TECHNICAL FIELD

The disclosure generally relates to the field of consumer coupons and, more particularly to secure printing of consumer coupons.

BACKGROUND

The delivery of coupons via a wide range of media continues to grow. No longer are consumers limited to waiting for a Sunday paper to arrive. Many coupons are available electronically, providing instant access to money-saving options for anyone with some type of computing device and a printer. Printed electronic coupons, however, present serious fraud risks for merchants and brands because they can be so easily duplicated by a consumer. Although fraud is rampant, the demand for electronic coupons ensures that they will not be going away. Thus, retailers and manufacturers who offer electronic coupons need better ways to prevent the misuse of electronic coupons.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-2B illustrate a simplified interaction diagram illustrating potential operations of a communication system according to at least one embodiment;

FIG. 4 illustrates one embodiment of components of an example machine able to read instructions from a machine-readable medium and execute them in a processor (or controller).

DESCRIPTION OF EMBODIMENTS

Overview

In at least one embodiment, a method is provided for secure printing, including providing, for display on a display screen of a user device, one or more coupon offers, receiving information indicating at least one offer is selected by a user, and communicating a unique identifier of the user device and an indication of the at least one selected offer to a coupon platform. The method also includes receiving the at least one selected offer to be printed if the at least one selected offer is available, and bypassing a print dialog box to provide the at least one selected offer directly to a default printer associated with the user device. In specific embodiments, the method includes communicating, to the coupon platform, an indication of whether the at least one selected offer was successfully printed. In more specific embodiments, if the print was successful for the at least one selected offer, the user device is blocked from printing the at least one selected offer again.

Embodiments

Figure 1:
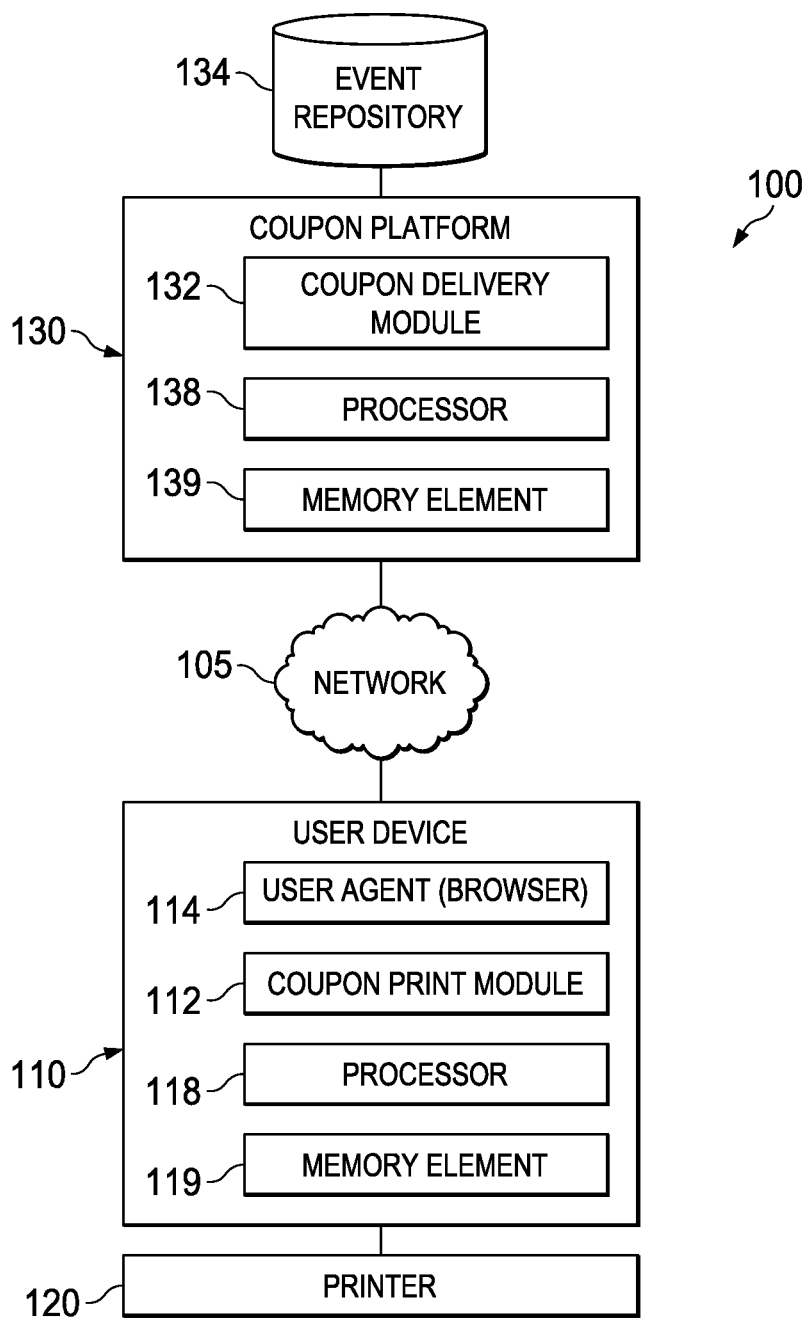
FIG. 1 illustrates an example communication system for printing electronic coupons in accordance with at least one embodiment.

FIG. 1 is a simplified block diagram of an example communication system 100 for providing secure printing in a network environment. In a particular implementation, communication system 100 may be configured to provide secure printing of electronic coupons by a user device. However, it will be apparent that communication system 100 could be implemented in any number of other scenarios in which secure, one-time printing is desired.

In at least one embodiment, communication system 100 may include a coupon platform 130 in communication with a user device 110 via at least one network 105. Coupon platform 130 may include a coupon delivery module 132, a processor 138, and a memory element 139. Coupon platform 130 may include or have access to an event repository 134 for storing coupon print events. User device 110 may include a coupon print module 112, a user agent 114 (e.g., a browser), a processor 118, and a memory element 119. User device 110 may also be configured with a print driver for a printer 120.

For purposes of illustrating certain example techniques of secure one-time printing in communication system 100, it is important to understand the communications that may be traversing the network environment. The following foundational information may be viewed as a basis from which the present disclosure may be properly explained.

Although distribution is both convenient and efficient for manufacturers and retailers, electronic coupons are plagued by fraud on the part of consumers. Once an electronic coupon is accessed by a user on a computing device, the coupon can be printed an unlimited amount of times and shared between any number of individuals. Often the actual printed copy itself may have protections to avoid further copies being made. For example, many printers cannot print or scan a particular dot configuration contained in printed material. Therefore, electronic coupons often contain this dot configuration in order to limit the reproduction of the coupon by scanning and copying. However, if the user has access to the electronic coupon on a computing device, the consumer could print, directly to a printer, any number of copies of the coupon.

Turning to the infrastructure of FIG. 1, elements of FIG. 1 may be coupled to one another through one or more interfaces employing any suitable connections (wired or wireless), which provide viable pathways for network communications. These networks may be inclusive of wire line technologies (e.g., Ethernet, etc.) and wireless technologies (e.g., Institute of Electrical and Electronics Engineers (IEEE) Std 802.11™-2012, published Mar. 29, 2012, IEEE Std 802.16™-2012, published Aug. 17, 2012, WiFi, WiMax, Dedicated short Range Communications (DSRC), etc.), satellite, cellular technologies (e.g., 3G/4G/5G/nG, etc.), other radio frequencies (e.g., near field communications (NFC), radio frequency identification (RFID), etc.), and/or any other networking protocols that facilitate network communications in a network environment. These networks may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

User device 110 is intended to include any computing system such as an electronic device, component, or element capable of performing voice, audio, video, media, and/or data exchanges within communication system 100 and configured to allow printing to a printer. User device 110 is inclusive of, but is not limited to, personal computers, desktops, laptops, mobile devices, tablet computers, personal digital assistants (PDAs), mobile phones, smart mobile phones (smartphones), e-book readers, tablets, iPads, personal digital assistants (PDAs), and electronic notebooks.

Coupon platform 130 may be a network element and may be deployed in a cloud infrastructure in at least one embodiment. A network element is meant to encompass servers, appliances, routers, switches, gateways, bridges, loadbalancers, firewalls, inline service nodes, proxies, processors, modules, or any other suitable device, component, element, or object operable to exchange information in a network environment. This network element may include any suitable hardware, software, components, modules, engines, or interfaces that facilitate the operations thereof. This may be inclusive of appropriate algorithms and communication protocols that allow for the effective exchange of data.

Printer 120 may be a peripheral device that is capable of communication with a computing system such as user device 110, and which can produce a representation of an electronic document on a physical media such as paper. A print driver or print processor may be installed on user device 110 and may include software that converts data to be printed into a form specific to printer 120, thus allowing applications to send print jobs to printer 120 without being aware of the underlying technical details of printer 120. A print dialog box may be configured to enable a user to select options (e.g., via user device 110) for a particular print job. In at least one embodiment, printer 120 is configured as the default printer for user device 110. Thus, print jobs on user device 110, for which a specific printer selection is not made, are automatically sent to printer 120, even if other printers are available and ready to receive print jobs.

Figure 2A:
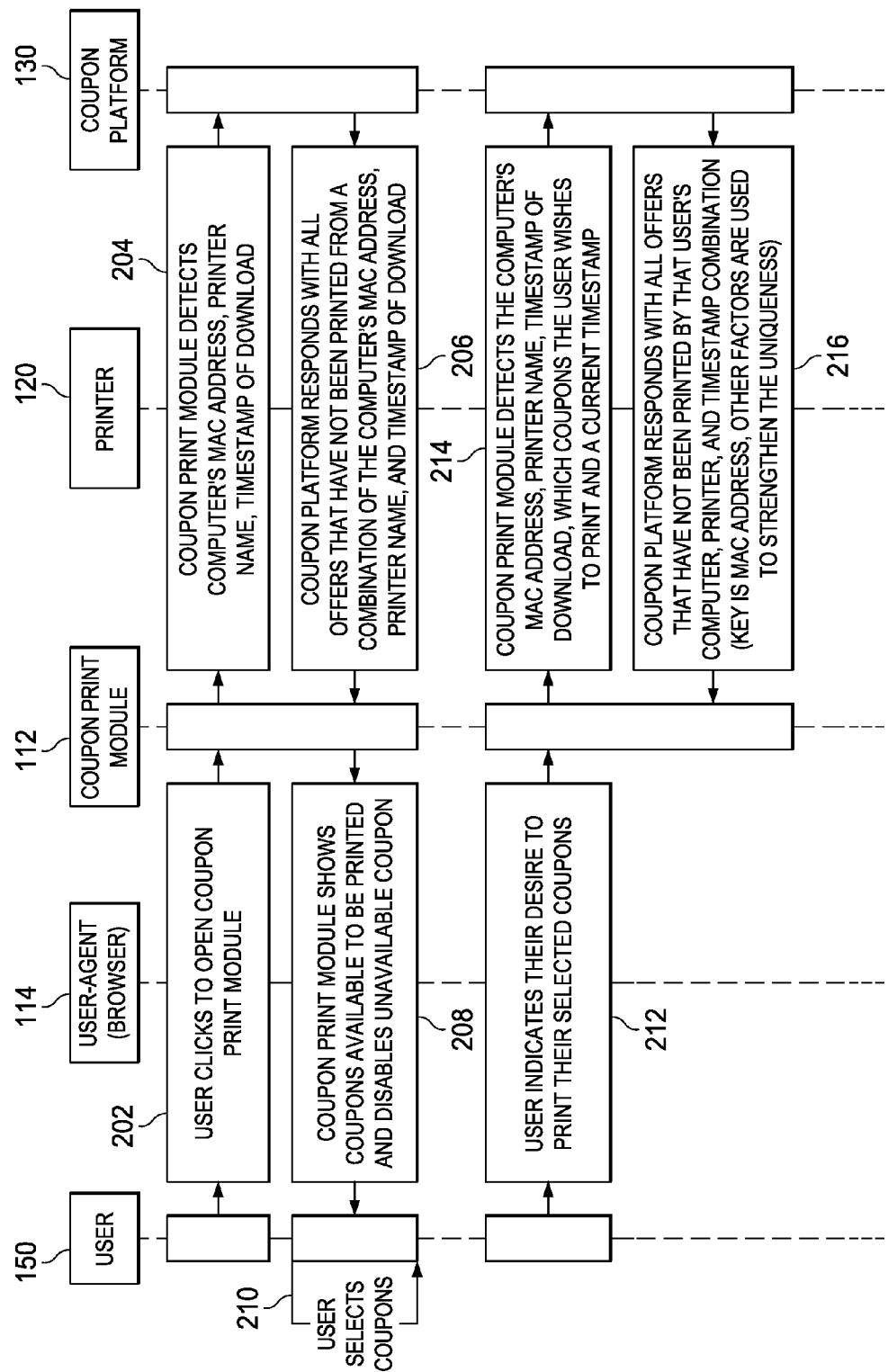

FIGS. 2A and 2B illustrate an interaction diagram between a user 150, a coupon print module 112, a printer 120, and a coupon platform 130. In at least one embodiment, coupon print module 112 and user-agent 114 may be executing on user device 110. Additionally, user device 110 and coupon platform 130 may communicate via a network such as network 105. In addition, in at least one embodiment, one or more of the activities described with reference to coupon platform 130 may be performed by coupon delivery module 132.

Initially, user 150 may download coupon print module 112 to user device 110. In one example, user 150 may access an Internet website via user-agent 114 searching for electronic coupons. When desired coupons are found via coupon platform 130, the user may be provided with an option to download coupon print module 112 in order to print the desired coupons.

Once coupon print module 112 is downloaded onto user device 110, an option to launch the module may be presented on a display of user device 110. At 202, a user may provide appropriate input to launch coupon print module 112 from user device 110. In at least one example embodiment, coupon print module 112 could be configured as an air file, thus allowing operation across diverse operating system platforms. However, any other software language code could be used based on particular needs and preferences.

When coupon print module 112 launches, it can determine a fingerprint or unique identifier to uniquely identify user device 110 in order to track offers successfully printed by user device 110. The fingerprint can help prevent multiple prints of a coupon from a single device (e.g., a consumer printing 100 copies of a single offer). In at least one embodiment, the fingerprint includes a media access control (MAC) address of user device 110. A MAC address is a unique address assigned to a network interface of a computing system, which may be assigned by a manufacturer of the interface. Other items of information may also be used in the fingerprint in at least some embodiments. For example, a printer name of a default printer configured on user device 110 and a timestamp of the download of coupon print module 112 may also be used in the fingerprint. Coupon print module 112 can detect the MAC address and the printer name of the default printer. In at least one embodiment, an email address of user 150 interacting with user device 110 may also be determined and used in the fingerprint. Finally, a timestamp of the download of computer print module 112 may also be determined. The MAC address of user device 110, and possibly one or more other items of information may be combined in any desired way (e.g., concatenated, combined with a secure hash applied, etc.) and provided to coupon platform 130 at 204.

At 206, coupon platform 130 can send a response to coupon print module 112 with all coupon offers that have not been printed from a source defined by the fingerprint. A 'coupon offer' (also referred to herein as 'offer') is generally identified by a coupon code (e.g., a universal product code (UPC) or other unique coupon identifier), which can be presented to a participating entity for redemption upon the purchase of a specified product or brand, or upon the purchase of items conforming to other criteria (e.g., spend $100 or more in a particular store) in the offer. An offer, therefore, is generally a financial discount or rebate based on certain guidelines and/or criteria specified in the offer.

At 208, coupon print module 112 may cause, at least in part, actions that result in the offers (received from coupon platform 130) being displayed on a display screen of, for example, user device 110. In at least one embodiment, coupon print module 112 can disable any offer that is unavailable (e.g., an offer that was previously successfully printed by user device 110). Thus, in at least some embodiments, all current offers (e.g., offers being accepted by merchants) may be displayed, with any unavailable offers disabled in some manner, such that user 150 cannot select the unavailable offers for printing.

At 210, user 150 may view the available offers being displayed and may select one or more available offers. User 150 can use any suitable input mechanism to select an offer including, but not limited to, a mouse, a trackball, a keyboard, a touch-screen display, voice, etc. Such input mechanisms may depend upon the particular configuration of user device 110. At 212, user 150 may indicate a desire to print the selected coupons. For example, a user may select a 'Print Coupon' option on the display.

At 214, coupon print module 112 can determine a fingerprint for user device 110. Coupon print module can detect the MAC address of user device 110 to be used in the fingerprint. In addition, coupon print module 112 may also detect the printer name of printer 120, which could be configured by user device 110 as a default printer, a timestamp of the download of coupon print module 112, which coupons the user selected for printing, and a current timestamp. In one example as previously described herein, a printer name of a default printer configured on user device 110 and a timestamp of the download of coupon module 112 may also be used in the fingerprint to strengthen the uniqueness of the fingerprint. The fingerprint may be provided to coupon platform 130 at 214.

At 216, coupon platform 130 may send a response to coupon print module 112 with all offers that have not been previously successfully printed by user device 110 (as identified by the fingerprint). In at least one embodiment, coupon platform 130 may search event repository 134 to determine which offers had previously been successfully printed by user device 110.

At 218, coupon print module 112 enables the printing of offers that meet the uniqueness requirements (e.g., offers selected by user 150, but not previously printed by user device 110). For each offer that has been selected by user 150, but that has not been previously successfully printed by user 110, coupon print module 112 may provide those offers to the user's default printer (e.g., printer 120) without a print dialog box. Thus, user 150 will not be prompted for how many copies they would like to print, or whether they would prefer to print to a PDF, etc. Therefore, user 150 can be prevented from printing multiple copies or saving the offer and sharing with others. In at least one embodiment, printer 120 is configured as a default printer for user device 110.

At 220, if the print was successful, coupon print module 112 may receive an indication that the print was successful from printer 120. In response to this message, coupon print module 112 may, at 222, send a message to coupon platform 130 indicating which offers were successfully printed for the particular fingerprint (e.g., MAC address, printer name) of the user device 110. At 224, coupon platform 130 may send a message to coupon print module 112 indicating that the event (i.e., successful print of selected offers by user device 110) was saved in event repository 134. At 226, coupon module 112 may display a message on a display of user device 110 indicating the print was successful. Coupon module 112 may also disable the successfully printed offers so that user 150 may not print them again.

Figure 3A:
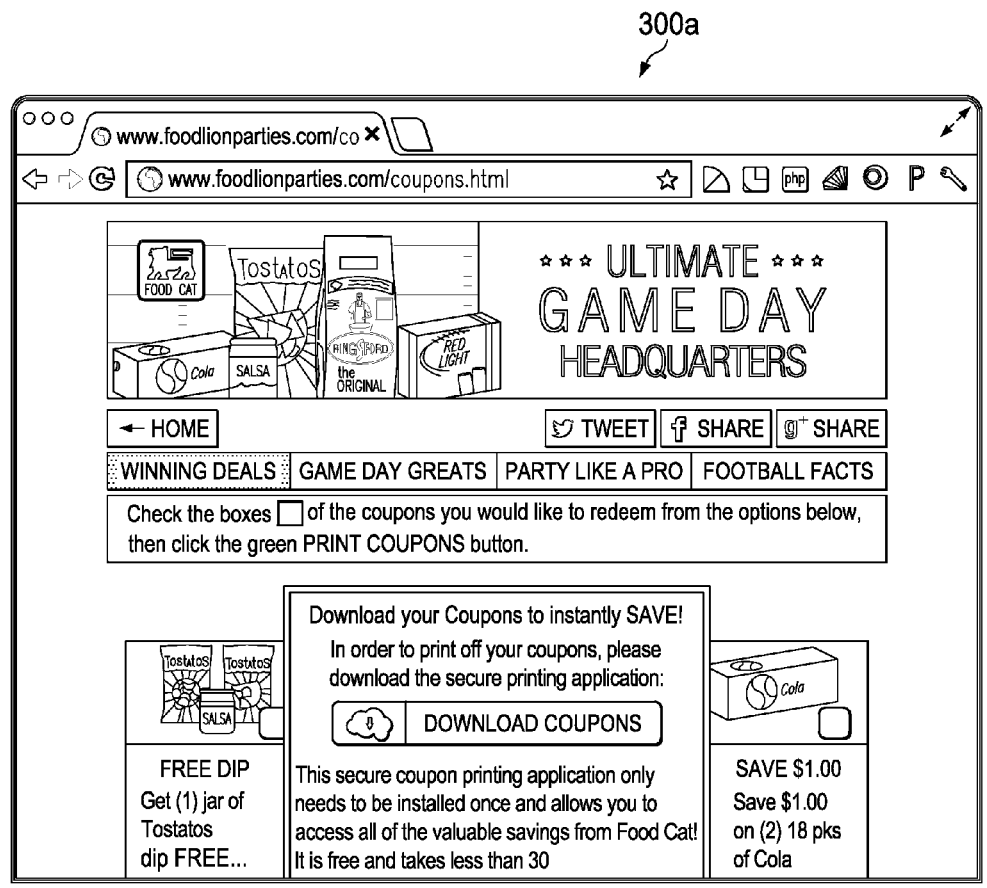
FIGS. 3A-3E are screenshots of user interfaces for a secure one-time print system according to at least one embodiment.

Turning to FIGS. 3A-3E, respective screenshots 300*a*-300*e* illustrate example graphical user interfaces that may be provided in a display of user device 110 according to embodiments disclosed herein. FIG. 3A is a screenshot 300*a* illustrating various offers, in addition to an option to download coupon print module 112, to enable selecting and printing any of the offers.

Figure 3B:
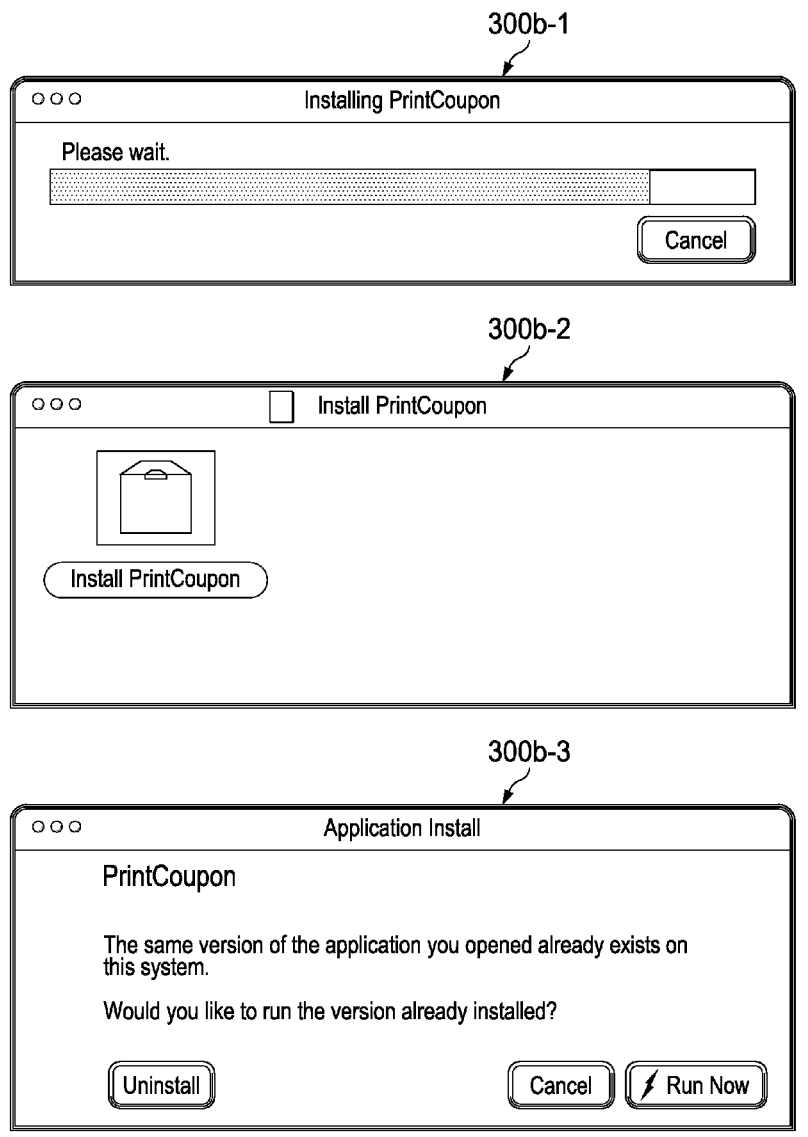
Figure 3C:
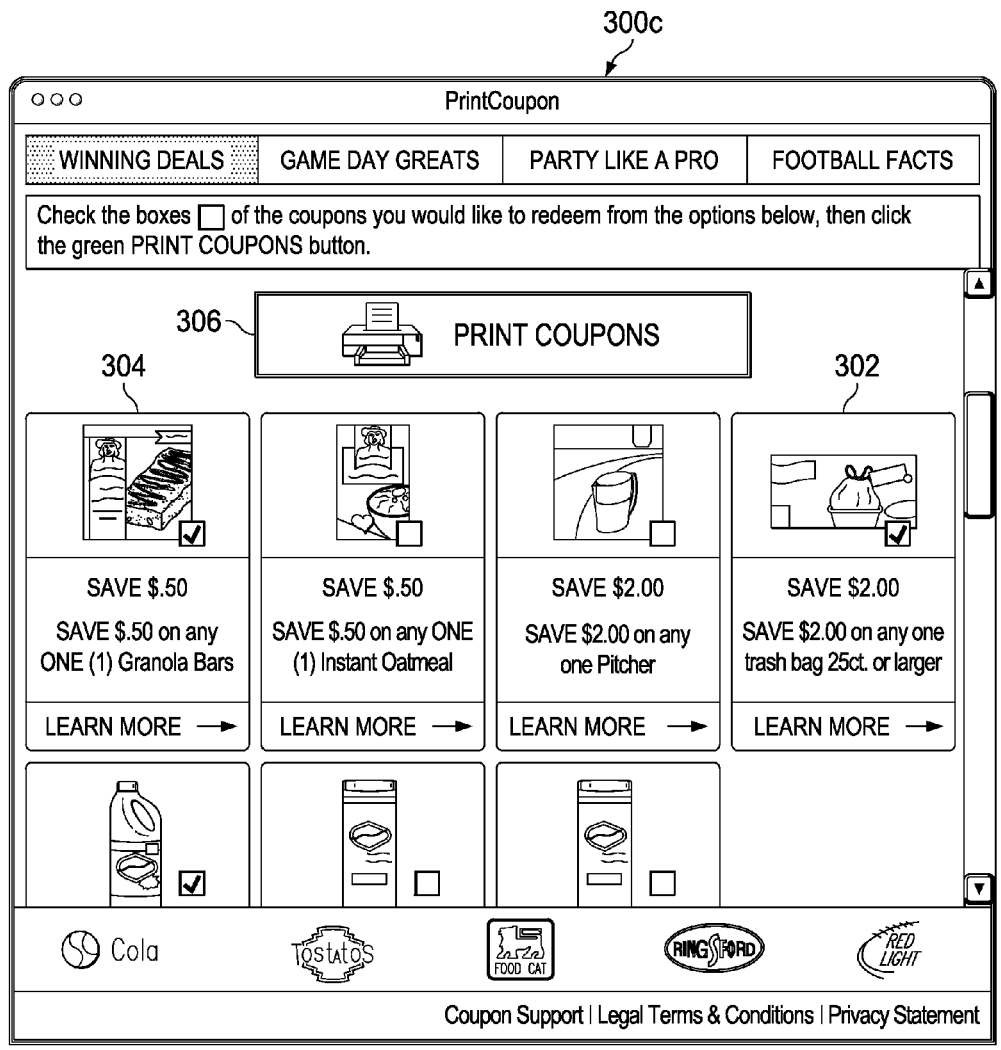
Figure 3D:
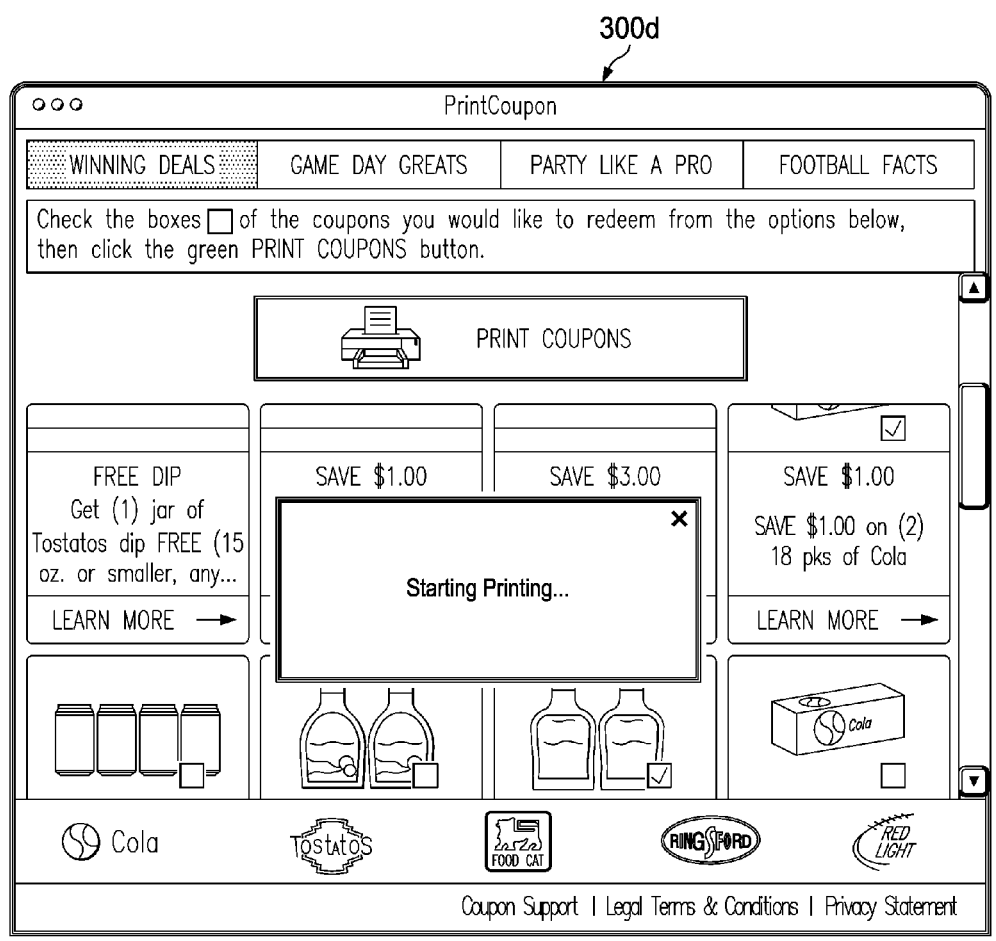

FIG. 3B illustrates three screenshots 300*b*-1, 300*b*-2, and 300*b*-3 (or windows) of various graphical user interfaces that may be displayed as coupon print module 112 is being downloaded to user device 110. FIG. 3C illustrates a screenshot 300*c* showing various coupons, or offers, available for user 150 to select, print, and redeem. As shown in this example scenario, user 150 selected two offers 302 and 304, by appropriate input (e.g., clicking on a selection box) and a check mark is entered in each selection box representing the particular offers. User 150 may then interact with user device 110 by providing appropriate input to a 'Print Coupons' task bar 306. For example, once the user has completed making selections of offers, user 150 may click on, touch (or otherwise activate) the 'Print Coupons' task bar 306. FIG. 3D is a screenshot 300*d* indicating an example view of what may be displayed after user 150 activated the 'Print Coupons' task bar.

Figure 3E:
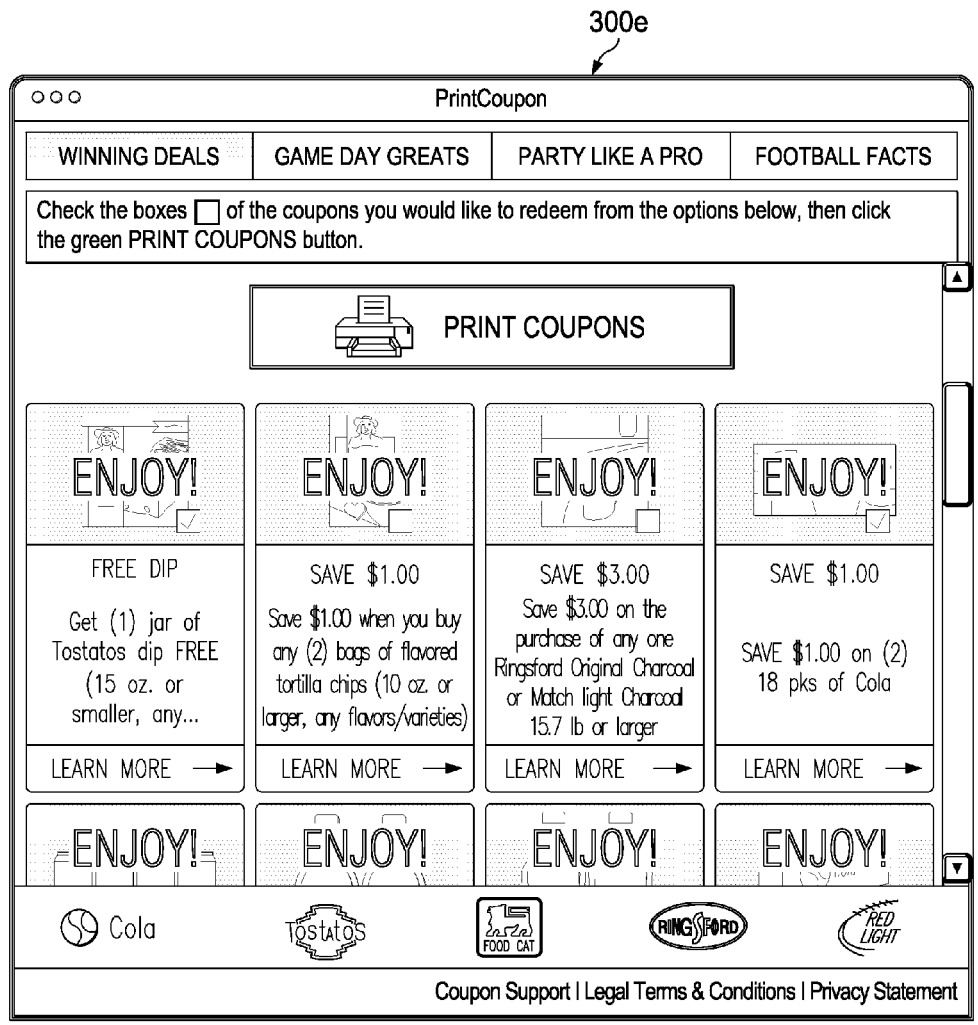

In FIG. 3E, a screenshot 300*e* illustrates an example of offers that have already been selected and printed from user device 110. Thus, these offers are shaded and there is no selection box available in the display for a user to select.

In each of the example views of shown in FIGS. 3A-3E, it will be apparent that a coupon code (e.g., UPC code or other identifier) is not shown or displayed to user 150. Therefore, the coupon code is protected from duplication and sharing.

FIG. 4 is a block diagram illustrating components of an example computing system able to read instructions from a machine-readable medium and execute them in a processor (or controller). In at least one embodiment, user device 110 and/or coupon platform 130 may be configured in the same or similar configuration as example computing system 400 of FIG. 4. FIG. 4, shows a diagrammatic representation of a computing system in the example form of a computer system 400 within which instructions 424 (e.g., software, logic, code) for causing the computing system to perform any one or more of the methodologies discussed herein may be executed. In alternative embodiments, the computing system operates as a standalone device or may be connected (e.g., networked) to other computing systems. In a networked deployment, the computing system may operate in the capacity of a server or a client in a server-client network environment, or as a peer in a peer-to-peer (or distributed) network environment.

The computing system may be a server, a client computer, personal computer (PC), a desktop, a laptop, a tablet, a web appliance, a network router, switch or bridge, loadbalancer, gateway, or any computing device, processor, element, or object capable of executing instructions 424 (sequential or otherwise) that specify actions to be taken by that computing system.

The example computer system 400 includes a processor 402 (e.g., one or more central processing units (CPU), a graphics processing unit (GPU), a digital signal processor (DSP), one or more application specific integrated circuits (ASICs), one or more radio-frequency integrated circuits (RFICs), etc., or any appropriate combination of these), a main memory 404, and a static memory 406, which are configured to communicate with each other via a bus 408.

The computer system 400 may further include graphics display unit 408 (e.g., a plasma display panel (PDP), a liquid crystal display (LCD), a projector, or a cathode ray tube (CRT)). The computer system 400 may also include alphanumeric input device 410 (e.g., a keyboard), a cursor control device 412 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which are stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400. The main memory 404 and the processor 402 also constitute machine-readable media. The instructions 424 (e.g., software) may be transmitted or received over network 110 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the computing system and that cause the computing system to perform any one or more of the methodologies disclosed herein. The term "machine-readable medium" includes, but is not intended to be limited to, data repositories in the form of solid-state memories, optical media, and magnetic media. Additionally, the terms "computer readable medium" and "computer readable storage medium" may be used interchangeably with "machine-readable medium."

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Certain embodiments are described herein as including logic or a number of components, modules, or mechanisms, for example, as noted with respect to FIGS. 1 through 3. Modules may constitute either software modules (e.g., code embodied on a machine-readable medium or in a transmission signal), firmware modules, or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Note that any functions outlined herein that are implemented by logic may be encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). In some of these instances, memory elements (e.g., memory elements 404, 406, 416) can store data used for the operations described herein. This includes the memory elements being able to store software, logic, code, or processor instructions that are executed to carry out the activities described herein.

Additionally, a processor can execute any type of instructions associated with the data to achieve the operations detailed herein. For example, the processors (as shown in FIG. 4) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

The one or more processors, e.g., 402, may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Although the present disclosure has been described in detail with reference to particular arrangements and configurations, these example configurations and arrangements may be changed significantly without departing from the scope of the present disclosure. Additionally, although communication system 100 has been illustrated with reference to particular elements and operations that facilitate the secure printing activities, these elements and operations may be replaced by any suitable architecture, protocols, and/or processes that achieve the intended functionality of communication system 100.

What is claimed is:

1. A method, comprising:
    providing, for display on a display screen of a user device, one or more coupon offers;
    receiving information indicating at least one offer is selected by a user;

communicating a unique identifier of the user device and an indication of the at least one selected offer to a coupon platform;

receiving the at least one selected offer to be printed if the at least one selected offer is available;

bypassing a print dialog box to provide the at least one selected offer directly to a default printer associated with the user device;

receiving, from the default printer, an indication of whether the at least one selected offer was successfully printed; and disabling the at least one selected offer after receiving an indication that the at least one selected offer was successfully printed, wherein the disabling includes blocking a user from selecting the at least one selected offer to be printed, wherein the one or more coupon offers include only coupon offers that have not been successfully printed by the user device, and wherein the determination of whether a coupon offer has not been printed on the user device is based, at least in part, on the media access control (MAC) address of the user device.

2. The method of claim 1, wherein a coupon code corresponding to the at least one selected offer is not displayed on the user device.

3. The method of claim 1, further comprising:

communicating the unique identifier to the coupon platform before the one or more coupon offers are displayed on the user device; and receiving a response indicating the one or more coupon offers are available to be printed.

4. The method of claim 1, wherein the unique identifier includes a media access control (MAC) address of the user device.

5. The method of claim 4, wherein the unique identifier further includes one or more of a printer name of the default printer, a timestamp, and an electronic mail address.

6. The method of claim 1, further comprising:

communicating, to the coupon platform, an indication of whether the at least one selected offer was successfully printed.

7. At least one non-transitory computer readable medium having instructions stored therein that, when executed, cause one or more processors to:

provide, for display on a display screen of a user device, one or more coupon offers;

receive information indicating at least one offer is selected by a user;

communicate a unique identifier of the user device and an indication of the at least one selected offer to a coupon platform;

receive the at least one selected offer to be printed if the at least one selected offer is available;

bypass a print dialog box to provide the at least one selected offer directly to a default printer associated with the user device;

receive, from the default printer, an indication of whether the at least one selected offer was successfully printed; and disable the at least one selected offer after receiving an indication that the at least one selected offer was successfully printed, wherein the disabling is to include blocking a user from selecting the at least one selected offer to be printed, wherein the one or more coupon offers include only coupon offers that have not been successfully printed by the user device, and wherein the determination of whether a coupon offer has not been printed on the user device is based, at least in part, on the media access control (MAC) address of the user device.

8. The at least one non-transitory computer readable medium of claim 7, wherein a coupon code corresponding to the selected offer is not displayed on the user device.

9. The at least one non-transitory computer readable medium of claim 7, wherein the unique identifier includes a media access control (MAC) address of the user device.

10. The at least one non-transitory computer readable medium of claim 9, wherein the unique identifier further includes one or more of a printer name of the default printer, a timestamp, and an electronic mail address.

11. The at least one non-transitory computer readable medium of claim 7, wherein the instructions, when executed, cause the one or more processors to:

communicate, to the coupon platform, an indication of whether the at least one selected offer was successfully printed.

12. The at least one non-transitory computer readable medium of claim 7, wherein the instructions, when executed, cause the one or more processors to:

communicate the unique identifier to the coupon platform before the one or more coupon offers are displayed on the user device; and receive a response indicating the one or more coupon offers are available to be printed.

13. An apparatus comprising:

at least one processor;

a coupon print module configured to be executed by the at least one processor to:

provide, for display on a display screen of a user device, one or more coupon offers;

receive information indicating at least one offer is selected by a user;

communicate a unique identifier of the user device and an indication of the at least one selected offer to a coupon platform;

receive the at least one selected offer to be printed if the at least one selected offer is available;

bypass a print dialog box to provide the at least one selected offer directly to a default printer associated with the user device;

receive, from the default printer, an indication of whether the at least one selected offer was successfully printed; and disable a coupon offer after receiving an indication that the coupon offer was successfully printed, wherein disabling the coupon offer is to include blocking a user from selecting the coupon offer to be printed, wherein the one or more coupon offers include only coupon offers that have not been successfully printed by the user device, and wherein the determination of whether a coupon offer has not been printed on the user device is based, at least in part, on the media access control (MAC) address of the user device.

14. The apparatus of claim 13, wherein a coupon code corresponding to the at least one selected offer is not displayed on the user device.

15. The apparatus of claim 13, wherein the unique identifier includes a media access control (MAC) address of the user device.

16. The apparatus of claim 13, wherein the print module is configured to be executed by the at least one processor to:

communicate, to the coupon platform, an indication of whether the at least one selected offer was successfully printed.

17. The apparatus of claim 13, wherein the print module is configured to be executed by the at least one processor to:
- communicate the unique identifier to the coupon platform before the one or more coupon offers are displayed on the user device; and
- receive a response indicating the one or more coupon offers are available to be printed.

18. The apparatus of claim 13, wherein the unique identifier further includes one or more of a printer name of the default printer, a timestamp, and an electronic mail address.

* * * * *